United States Patent
Zhang et al.

(10) Patent No.: US 9,563,614 B2
(45) Date of Patent: Feb. 7, 2017

(54) BROWSER AND METHOD FOR ADDING AND DISPLAYING WEB PICTURE COMMENT

(75) Inventors: Dongtao Zhang, Shenzhen (CN); Guihai Miao, Shenzhen (CN); Li Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 499 days.

(21) Appl. No.: 14/004,863

(22) PCT Filed: Jul. 20, 2011

(86) PCT No.: PCT/CN2011/077345
§ 371 (c)(1),
(2), (4) Date: Sep. 12, 2013

(87) PCT Pub. No.: WO2012/122769
PCT Pub. Date: Sep. 20, 2012

(65) Prior Publication Data
US 2013/0346847 A1    Dec. 26, 2013

(30) Foreign Application Priority Data

Mar. 16, 2011    (CN) .......................... 2011 1 0063293

(51) Int. Cl.
*G06F 17/22* (2006.01)
*G06F 17/24* (2006.01)
*G06F 17/30* (2006.01)

(52) U.S. Cl.
CPC ......... *G06F 17/241* (2013.01); *G06F 17/3089* (2013.01); *G06F 17/30899* (2013.01)

(58) Field of Classification Search
CPC .................................................. G06F 17/241
(Continued)

(56) References Cited

U.S. PATENT DOCUMENTS

| 5,581,682 | A  | * | 12/1996 | Anderson et al. ............. 715/236 |
| 6,230,169 | B1 | * | 5/2001  | Nagae ................... G06F 17/241 715/203 |

(Continued)

FOREIGN PATENT DOCUMENTS

| CN | 101521854 A | 9/2009 |
| CN | 101790139 A | 7/2010 |

(Continued)

OTHER PUBLICATIONS

Hua et al., Semantic Knwledge Extraction and Annotation for Web Pages:, ACM, 2005, pp. 467-470.*
(Continued)

*Primary Examiner* — James J Debrow
(74) *Attorney, Agent, or Firm* — Oppedahl Patent Law Firm LLC

(57) ABSTRACT

The present disclosure discloses a browser and a method for adding and displaying a web picture comment. The method for adding the comment includes that: information on a content of a comment on a picture and a location of the comment on the picture is acquired, relative coordinates of the location of the comment on the picture with respect to a fixed reference point within the picture is calculated; and comment parameters comprising the relative coordinates, the content of the comment, and an ID of the picture are uploaded to a web server; and a comment information layer is formed using the comment parameters, and is placed on a picture layer; when a user enters a web page, the browser requests the web server to display comment information, calculates absolute coordinates of the location of the comment on the picture, and places the formed comment information layer on the picture layer to display. With the present disclosure, a comment can be pasted on a certain part of a picture while the page is kept stationary, which is graphic and vivid, and quite interesting, and works well especially (Continued)

for commenting an animation/cartoon/comics product, thereby enhancing user loyalty to an internet product.

8 Claims, 4 Drawing Sheets

(58) Field of Classification Search
USPC ........................................................ 715/230
See application file for complete search history.

(56) References Cited

U.S. PATENT DOCUMENTS

| | | | |
|---|---|---|---|
| 6,320,169 B1* | 11/2001 | Clothier | 219/626 |
| 7,234,106 B2* | 6/2007 | Simske | 715/230 |
| 8,640,023 B1* | 1/2014 | Murray | G06F 17/30873 715/230 |
| 2004/0143796 A1* | 7/2004 | Lerner | G06F 3/04883 715/234 |
| 2004/0205541 A1 | 10/2004 | D Amico | |
| 2005/0289452 A1* | 12/2005 | Kashi et al. | 715/512 |
| 2008/0147841 A1* | 6/2008 | Nishino | H04L 67/02 709/223 |
| 2009/0063948 A1* | 3/2009 | Finn | G06F 17/24 715/230 |
| 2009/0187817 A1* | 7/2009 | Ivashin | G06F 17/241 715/230 |
| 2009/0254529 A1 | 10/2009 | Goldentouch | |
| 2009/0327855 A1* | 12/2009 | Le | G06F 17/30882 715/230 |
| 2010/0153835 A1* | 6/2010 | Xiong et al. | 715/230 |
| 2010/0325527 A1* | 12/2010 | Estrada | G06F 17/241 715/230 |
| 2011/0066636 A1 | 3/2011 | Guido et al. | |
| 2011/0066957 A1 | 3/2011 | Prats et al. | |
| 2011/0158532 A1* | 6/2011 | Chung | G06K 9/3258 382/176 |

FOREIGN PATENT DOCUMENTS

| | | |
|---|---|---|
| CN | 101814118 A | 8/2010 |
| JP | 2001518669 A | 10/2001 |
| JP | 2010124494 A | 6/2010 |

OTHER PUBLICATIONS

International Search Report in international application No. PCT/CN2011/077345, mailed on Oct. 13, 2011. (2 pages).
English Translation of the Written Opinion of the International Search Authority in international application No. PCT/CN2011/077345, mailed on Oct. 13, 2011. (8 pages).
Simon Philip Willison: "Building a decentralised collaborative annotation system for the World-Wide Web", May 1, 2005, XP055137687, Bath, England; Retrieved from the Internet: URL: http://www.cs.bath.ac.uk/~mdv/courses/CM30082/projects.bho/2004-5/SimonWillison-2004-5.pdf; [retrieved on Sep. 2, 2014]. (86 pages—see Supplementary European Search Report in European application No. 11861008.8 for relevant pages).
Supplementary European Search Report in European application No. 11861008.8, mailed on Sep. 10, 2014. (7 pages—see entire document).
How to implement the program and Web browser Picture Display additional comment, mailed on Jul. 7, 2015.

\* cited by examiner

BROWSER AND METHOD FOR ADDING AND DISPLAYING WEB PICTURE COMMENT

TECHNICAL FIELD

The disclosure relates to the field of Internet technology, and in particular to a browser and a method for adding and displaying a web picture comment.

BACKGROUND

A general method for implementing a picture comment on a website is the same as that for implementing an ordinary comment, where contents of the comments are displayed one by one below a picture. However, if a comment is to be made on a certain part of the picture, positioning is possible only through description in words, which is neither graphic nor visual, thereby limiting the effect of the comment seriously.

SUMMARY

In view of this, embodiments of the present disclosure provide a browser and method for adding and displaying a web picture comment to solve the problem of incapability of positioned commenting of a picture in an existing technique.

Specifically, an embodiment of the present disclosure provides a method for adding a web picture comment, including:

acquiring information on a content of a comment on a picture and a location of the comment on the picture, calculating relative coordinates of the location of the comment on the picture with respect to a fixed reference point within the picture; and uploading comment parameters comprising the relative coordinates, the content of the comment, and an ID of the picture to a web server, forming a comment information layer using the comment parameters, and placing the comment information layer on a picture layer.

In the method, the calculating relative coordinates of the location of the comment on the picture with respect to a fixed reference point within the picture is specifically:

calculating absolute coordinates of the fixed reference point, and calculating a difference between absolute coordinates of the location of the comment on the picture and the absolute coordinates of the fixed reference point to acquire the relative coordinates of the location of the comment on the picture with respect to the fixed reference point.

Wherein, the fixed reference point may be a vertex of a top left corner of the picture; the absolute coordinates of the fixed reference point may be a sum of relative coordinates of all layers between the picture as a child object and a parent object of an outermost layer.

The method may also include: when the picture is a scaled picture, restoring the relative coordinates to be uploaded to the web server to relative coordinates in 1:1 according to the scale of the picture.

An embodiment of the present disclosure further provides a method for displaying a web picture comment, including:

sending a picture comment displaying request to a web server, and receiving comment parameters comprising relative coordinates and a content of a comment fed back by the web server; and calculating absolute coordinates of a location of the comment on a picture in a web page, forming a comment information layer based on the absolute coordinates of the location of the comment on the picture and the comment parameters, and placing the comment information layer on a picture layer in the web page, thus achieving comment display.

In the method, the calculating absolute coordinates of a location of the comment on a picture in a web page is specifically:

calculating absolute coordinates of a fixed reference point of the relative coordinates in the web page, and summing the absolute coordinates and the relative coordinates to acquire the absolute coordinates of the location of the comment on the picture in the web page.

Wherein, the fixed reference point of the relative coordinates is a vertex of a top left corner of the picture; the absolute coordinates of the fixed reference point are a sum of relative coordinates of all layers between the picture as a child object and a parent object of an outermost layer.

The method in an embodiment of the present disclosure further has the following characteristics:

the method may also include: when the picture is a scaled picture, scaling the relative coordinates according to the scale of the picture after receiving the relative coordinates, wherein a triggering condition of sending a picture comment displaying request to a web server is: automatic triggering by a browser when entering the web page, or triggering by a user after entering the web page; and a way of displaying comment information comprises one of the following ways: displaying in chronological order of the comment, displaying according to a set number of pieces of comment information, and displaying according to a priority.

An embodiment of the present disclosure also provides a browser, including: a comment adding module and a comment displaying module, wherein the comment adding module includes:

an information acquiring module, configured to acquire information on a content of a comment on a picture and a location of the comment on the picture, calculate relative coordinates of the location of the comment on the picture with respect to a fixed reference point within the picture; and a comment addition implementing module, configured to upload comment parameters comprising the relative coordinates, the content of the comment and an ID of the picture to a web server, form a comment information layer using the comment parameters, and place the comment information layer on a picture layer; and the comment displaying module includes:

a comment parameter acquiring module, configured to send a picture comment displaying request to the web server and receive the comment parameters comprising the relative coordinates and the content of the comment fed back by the web server; and a comment display implementing module, configured to calculate absolute coordinates of the location of the comment on the picture in a web page, form a comment information layer based on the absolute coordinates of the location of the comment on the picture and the comment parameters, and place the comment information layer on the picture layer in the web page, thus achieving comment display.

The browser according to an embodiment of the present disclosure may further have the following characteristics:

when the picture is a scaled picture, the information acquiring module may restore the relative coordinates to be uploaded to the web server to relative coordinates in 1:1 according to the scale of the picture;

when the picture is a scaled picture, the comment parameter acquiring module may scale the relative coordinates according to the scale of the picture after receiving the relative coordinates.

a triggering condition for the comment parameter acquiring module to send the picture comment displaying request to the web server may include: automatic triggering by the browser when entering the web page, or triggering by a user after entering the web page; and a way of displaying comment information by the comment display implementing module may include one of the following ways: displaying in chronological order of the comment, displaying according to a set number of pieces of comment information and displaying according to a priority.

Compared with the existing technique, the embodiments of the present disclosure have the following advantageous effect:

with the method for adding and displaying a picture comment provided by the embodiments of the present disclosure, commenting of a picture is implemented, and a comment can be pasted on a certain part of a picture while the page is kept stationary, which is graphic and vivid, and quite interesting, and works well especially for commenting an animation/cartoon/comics product, thereby enhancing user loyalty to an internet product.

BRIEF DESCRIPTION OF THE DRAWINGS

To clarify a technical solution in embodiments of the present disclosure or in an existing technique, accompanying drawings required in the description of the embodiments or the existing technique are briefly introduced below. Apparently, the accompanying drawings described below are merely some embodiments of the present disclosure, and the ordinary skilled in the art may obtain other accompanying drawings according to these listed below without any creative effort.

DETAILED DESCRIPTION

A technical solution in an embodiment of the present disclosure will be elaborated clearly and completely with reference to an accompanying drawing in the embodiment of the present disclosure. Apparently, the described embodiments are merely part of embodiments of the present disclosure, rather than entire embodiments. All other embodiments obtained by the ordinary skilled in the art without creative effort based on an embodiment of the present disclosure fall in the protection scope of the present disclosure.

To solve the problem of incapability of positioned commenting of a picture in a web page in an existing technique, the embodiments of the present disclosure provide a browser and a method for adding and displaying a web picture comment. With the method, it is possible to paste a comment on a certain part of a picture, which makes the picture comment vivid, visual and quite interesting, thereby strengthening appeal of an internet product to a user.

Figure 1:
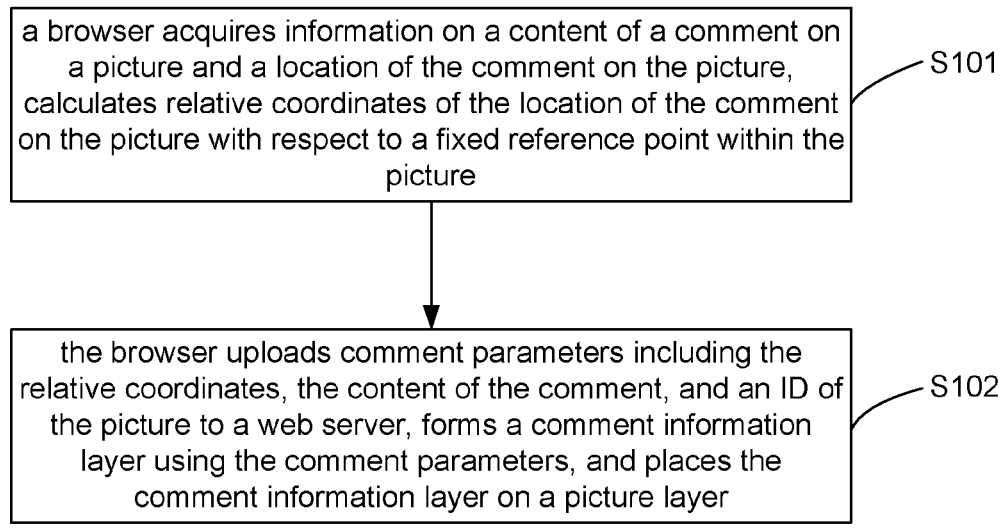
FIG. 1 is a flow chart of a method for adding a web picture comment provided by the present disclosure.

As shown in FIG. 1, the present disclosure provides a method for adding a web picture comment, the method including the following steps:

Step S101, a browser acquires information on a content of a comment on a picture and a location of the comment on the picture, calculates relative coordinates of the location of the comment on the picture with respect to a fixed reference point within the picture;

The step is specifically that: the browser calculates absolute coordinates of the fixed reference point, and calculates a difference between absolute coordinates of the location of the comment on the picture and the absolute coordinates of the fixed reference point to acquire the relative coordinates of the location of the comment on the picture with respect to the fixed reference point.

Wherein, the fixed reference point is preferably a vertex of a top left corner of the picture where the absolute coordinates of the fixed reference point are a sum of relative coordinates of all layers between the picture as a child object and a parent object of an outermost layer;

Step S102, the browser uploads comment parameters including the relative coordinates, the content of the comment, and an ID of the picture to a web server, forms a comment information layer using the comment parameters, and places the comment information layer on a picture layer.

Figure 2:
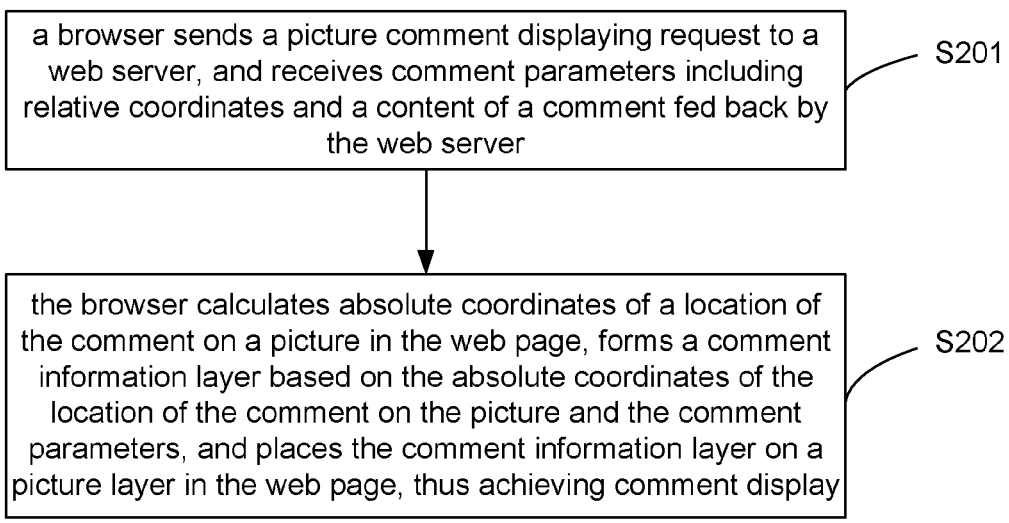
FIG. 2 is a flow chart of a method for displaying a web picture comment provided by the present disclosure.

As shown in FIG. 2, the present disclosure further provides a method for displaying a web picture comment, the method including the following steps:

Step S201, a browser sends a picture comment displaying request to a web server, and receives comment parameters including relative coordinates and a content of a comment fed back by the web server;

wherein a triggering condition for the browser to send the picture comment displaying request to the web server includes: automatic triggering by the browser when entering a web page, or triggering by a user after entering a web page.

Step S202, the browser calculates absolute coordinates of a location of the comment on a picture in the web page, forms a comment information layer based on absolute coordinates of the location of the comment on the picture and the comment parameters, and places the comment information layer on a picture layer in the web page, thus achieving comment display.

Wherein, a way of displaying comment information includes one of the following ways: displaying in chronological order of the comment, displaying according to a set number of pieces of comment information, and displaying according to a priority.

It may be seen from the above methods that in order to enable the comment to be "pasted" onto the picture and displayed as is, the most important thing is to acquire the coordinates of the location where the comment is to be pasted relative to the fixed reference point of the picture (for example, a left corner of the picture), such that the location of the comment will not be affected when coordinates of the picture itself change. After the relative coordinates are acquired, a comment layer is placed on the picture layer using page layering technology, and such a comment positioned at a certain location on the picture may thus be implemented.

Since the comment parameters are delivered to the web server when the comment is made, when the user would like to view the comment, the browser of the user sends a comment information acquiring request to the web server, acquires the comment parameters, and restores the content of the comment through javascript information parsing.

With the methods for adding and displaying a comment, the user is merely required to input the content of the comment in an input box of the browser page and click on a picture commenting button; then the user moves a mouse to a certain location of the picture, and clicks on a left button to paste the comment at the location, and thus the picture comment adding is completed; when this user or another user enters the web page with the picture comment, the browser downloads the comment information automatically for displaying, or is triggered to request to download and display by a user clicking on a picture comment displaying button, then the comments on the picture made by the user per se as well as by another user are displayed one by one, and the picture displaying is completed.

Several preferred embodiments of the present disclosure are given below according to FIG. 3 and FIG. 4, and a technical detail of the present disclosure is further given in combination with the description of the embodiments so as to better illustrate a specific process of implementing a method of the present disclosure.

Embodiment 1

Figure 3:
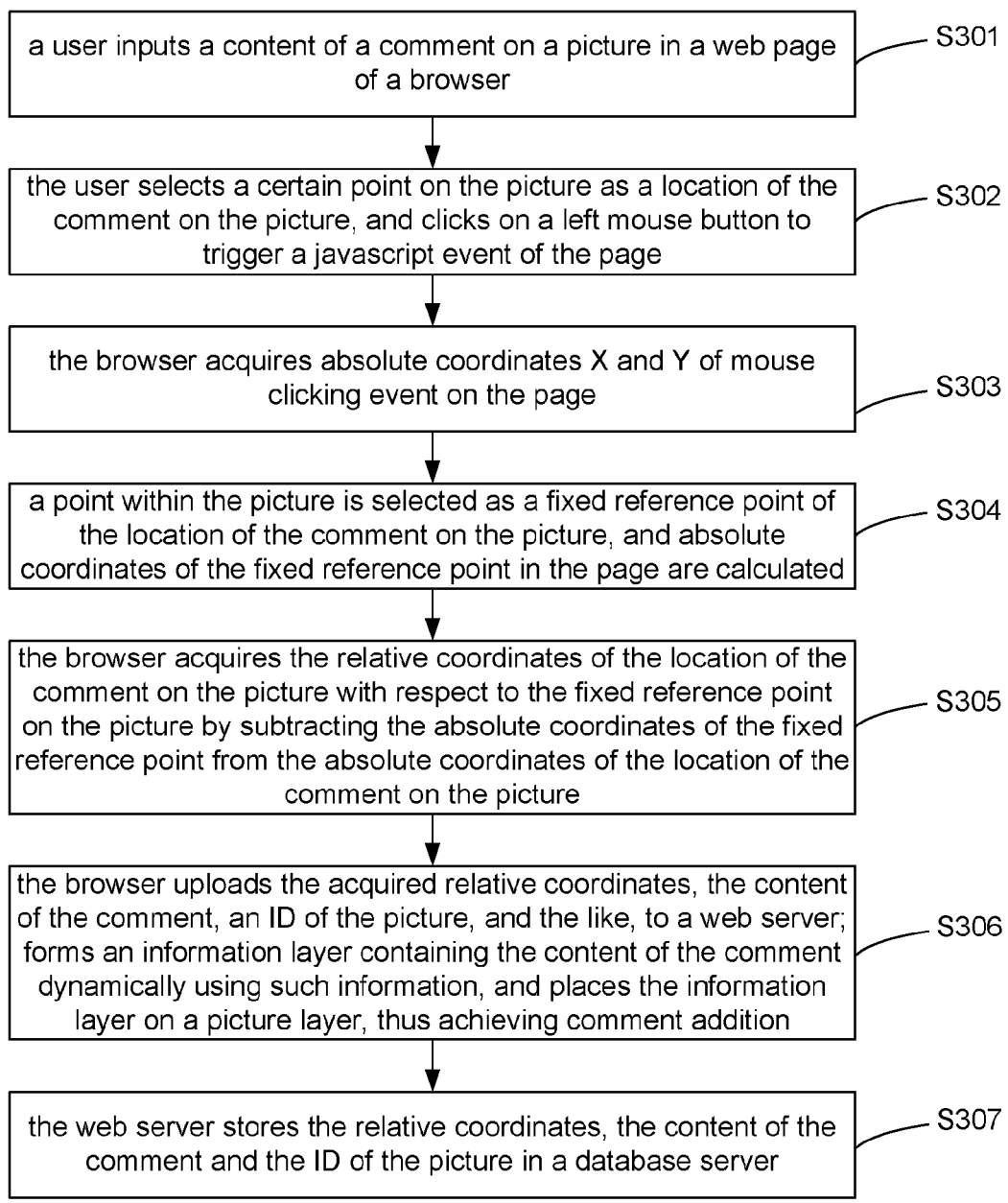
FIG. 3 is a flow chart of a method for adding a web picture comment provided by an embodiment of the present disclosure.

An embodiment of the present disclosure provides a method for adding a web picture comment, as shown in FIG. 3, the method including the following steps:

Step S301, a user inputs a content of a comment on a picture in a web page of a browser.

Step S302, the user selects a certain point on the picture as a location of the comment on the picture, and clicks on a left mouse button to trigger a javascript event of the page.

Step S303, the browser acquires absolute coordinates X and Y of the mouse clicking event on the page (i.e., absolute coordinates of the location of the comment on the picture), wherein values of the absolute coordinates X and Y are of the mouse event itself and can be extracted directly.

Step S304, a point within the picture is selected as a fixed reference point of the location of the comment on the picture, and absolute coordinates of the fixed reference point in the page are calculated;

Generally, the picture and parent objects thereof are not provided with an absolute coordinate attribute, therefore a vertex of a top left corner of the picture is preferably selected as the fixed reference point; the absolute coordinates of the vertex of the top left corner of the picture are a sum of relative coordinates of all layers between the picture as a child object and a parent object of an outermost layer, the calculating flow of which is that: relative coordinates of the picture with respect to the parent object of the picture are extracted, and are added with relative coordinates of the parent object with respect to a grand-parent object, and then added with relative coordinates of the grand-parent object with respect to a parent object of the grand-parent object, and so on till there is no parent object can be found, thereby resulting in values of absolute coordinates of the vertex of the top left corner of the picture.

However, when the picture is provided with the absolute coordinate attribute, the browser may select any point in the picture other than the point of the location of the comment on the picture as the fixed reference point, then it is required to merely record the selected reference point and acquire directly the absolute coordinates of the point. Therefore, the fixed reference point according to the present disclosure may be selected randomly; an edge point of the picture is preferably selected as the fixed reference point only if the browser does not support the absolute coordinate attribute of the picture.

Step S305, the browser acquires the relative coordinates of the location of the comment on the picture with respect to the fixed reference point on the picture by subtracting the absolute coordinates of the fixed reference point from the absolute coordinates of the location of the comment on the picture.

Step S306, the browser uploads the acquired relative coordinates, along with the content of the comment input by the user, an ID of the picture, and the like, to a web server; forms an information layer containing the content of the comment in real-time dynamically through html and javascript layering technology using such information, and places the information layer on a picture layer, thus achieving comment addition; then the user can visually see the effect of his/her own comment immediately.

In this step, during information convey to the web server, the browser submits information data preferably through AJAX page technology, so as to keep the web page stationary.

It is worth mentioning that, when the picture is a scaled picture, the relative coordinates to be uploaded to the web server is restored to relative coordinates in 1:1 according to the scale of the picture; meanwhile, the relative coordinates for generating the new information layer are those calculated directly by the browser.

Step S307, the web server stores the relative coordinates, the content of the comment and the ID of the picture in a database server.

According to the above method for adding a comment, a specific example is given below for elaboration.

Example: a network user fills in a content of a comment of, for example, "two seagulls" in an input box for commenting a cartoon/comics/animation on a cartoon/comics/animation browsing page of a cartoon/comics/animation website, then clicks on a comment button, and moves a mouse onto a picture, in which case the mouse cursor becomes a crossed star, indicating it is allowed to click to paste the comment. In such case when the user clicks on a left mouse button at a location of two seagulls on the picture, a javascript mouse event of the page is triggered;

A javascript code of the page acquires absolute coordinates X and Y of the mouse clicking event on the page (i.e., the absolute coordinates of a location of the comment on the picture), and calculates the absolute coordinates of a fixed reference point within the page of the picture; subtracts the absolute coordinates of the fixed reference point from the absolute coordinates of the location of the comment on the picture to acquire relative coordinates of the location of the comment on the picture with respect to the fixed reference point on the picture;

a browser uploads the acquired relative coordinates, along with a user ID, the content of the comment, an ID of the picture, and the like, to a web server, submitting the data through AJAX page technology to keep the page stationary and enhance good user experience; meanwhile, the browser forms and pastes a new comment-information containing layer on the picture in real-time dynamically through html and javascript page layering technology and positioning technology using such information, which enables the user to visually see the effect of his/her own comment immediately.

Embodiment 2

Figure 4:
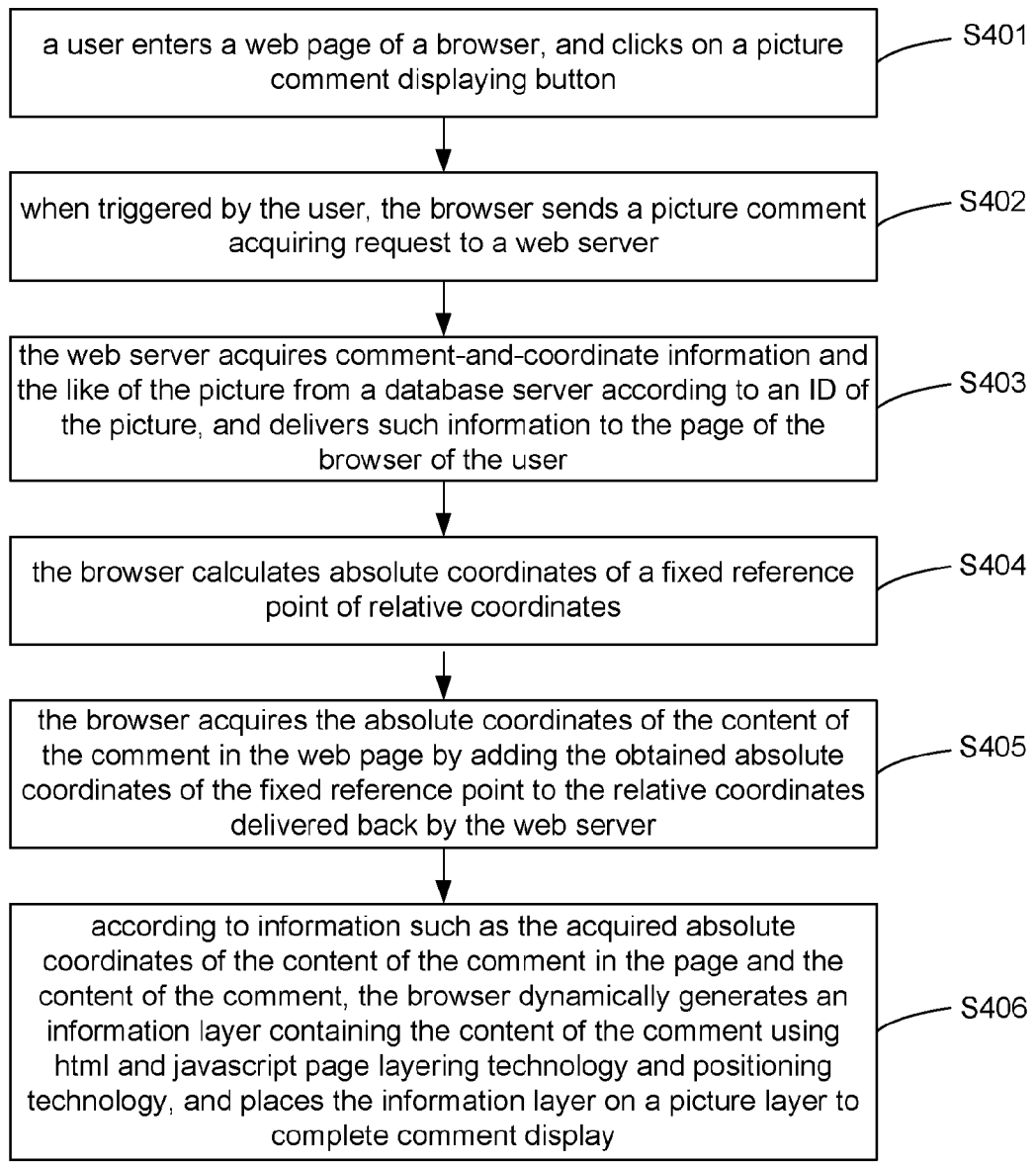
FIG. 4 is a flow chart of a method for displaying a web picture comment provided by an embodiment of the present disclosure.

This embodiment provides a method for displaying a web picture comment, as shown in FIG. 4, the method including the following steps:

Step S401, a user enters a web page of a browser, and clicks on a picture comment displaying button.

Step S402, when triggered by the user, the browser sends a picture comment acquiring request to a web server;

Preferably, the browser submits the request through AJAX page technology and keeps the page immobile in this step.

Step S403, the web server acquires comment-and-coordinate information and the like of the picture from a database server according to an ID of the picture, and delivers such information to the page of the browser of the user.

Step S404, the browser calculates absolute coordinates of a fixed reference point of relative coordinates;

In this step, when the fixed reference point is a vertex of the top left corner of the picture, a method for calculating the absolute coordinates thereof is the same as that in the step S304, namely: relative coordinates of the picture with respect to the parent object of the picture are extracted, and are added with relative coordinates of the parent object with respect to a grand-parent object, and then added with relative coordinates of the grand-parent object with respect to a parent object of the grand-parent object, and so on till there is no parent object can be found, thereby resulting in values of absolute coordinates of the vertex of the top left corner of the picture.

Step S405, the browser acquires the absolute coordinates of the content of the comment in the web page by adding the obtained absolute coordinates of the fixed reference point to the relative coordinates delivered back by the web server;

In this step, if a picture scaling function exists, then after acquiring the relative coordinates of the comment, the browser needs to scale according to a scale of the picture before performing addition.

Step S406, according to information such as the acquired absolute coordinates of the content of the comment in the page and the content of the comment, the browser dynamically generates an information layer containing the content of the comment using html and javascript page layering technology and positioning technology, and places the information layer on a picture layer to complete comment display.

To facilitate the user to view, comments may be displayed automatically one by one at an interval in chronological order of the comments through javascript technology of the page; or if there are too many comments, it is possible to display them in batches to avoid affecting the view by overlap of the comments; As one comment corresponds to one layer, a comment layer is higher in priority than the picture, and a new comment layer is higher in priority than an old comment layer, the new layer covers the old layer when overlap occurs.

The javascript technology in both of the above embodiments 1 and 2 may be replaced by VBSCRIPT technology.

In summary, with the method for adding and displaying a comment on a picture provided by the present disclosure, commenting of a picture is implemented, and a comment can be pasted on a certain part of a picture while the page is kept stationary, and display and concealment of the comment is controlled through a rational and convenient way, which is graphic and vivid, and quite interesting, and works well especially for commenting an animation/cartoon/comics product, thereby enhancing user loyalty to an internet product.

Figure 5:
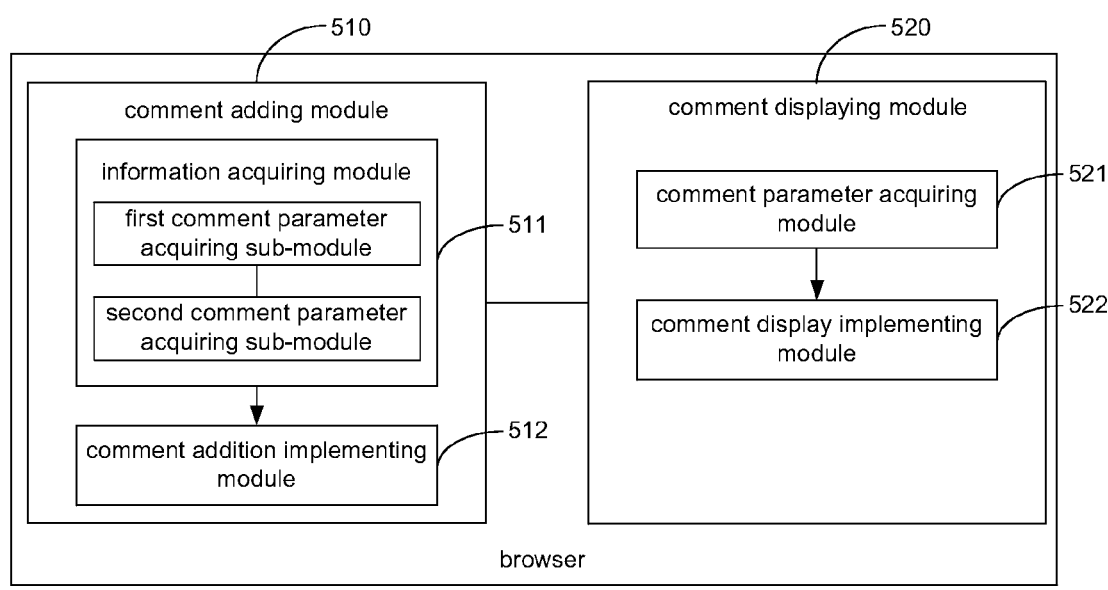
FIG. 5 is the diagram of a structure of a browser provided by the present disclosure.

As shown in FIG. 5, the present disclosure also provides a browser, specifically including: a comment adding module 510 and a comment displaying module 520, wherein the comment adding module 510 includes:

an information acquiring module 511, configured to acquire information on a content of a comment on a picture and a location of the comment on the picture, calculate relative coordinates of the location of the comment on the picture with respect to a fixed reference point within the picture; and a comment addition implementing module 512, configured to upload comment parameters including the relative coordinates, the content of the comment and an ID of the picture to a web server, form a comment information layer using the comment parameters, and place the comment information layer on a picture layer.

Wherein, the information acquiring module 511 includes:

a first comment parameter acquiring sub-module, configured to acquire the information on a content of a comment on a picture and a location of the comment on the picture; and a second comment parameter acquiring sub-module, configured to calculate absolute coordinates of the fixed reference point, and calculate a difference between absolute coordinates of the location of the comment on the picture and the absolute coordinates of the fixed reference point to acquire the relative coordinates of the location of the comment on the picture with respect to the fixed reference point.

Wherein, the fixed reference point is a vertex of a top left corner of the picture; the absolute coordinates of the fixed reference point are a sum of relative coordinates of all layers between the picture as a child object and a parent object of an outermost layer.

It is worth mentioning that, when the picture is a scaled picture, then the information acquiring module 511 restores the relative coordinates to be uploaded to the web server to relative coordinates in 1:1 according to the scale of the picture.

The comment displaying module 520 includes:

a comment parameter acquiring module 521, configured to send a picture comment displaying request to the web server and receive the comment parameters including the relative coordinates and the content of the comment fed back by the web server; and a comment display implementing module 522, configured to calculate absolute coordinates of the location of the comment on the picture in a web page, form a comment information layer based on the absolute coordinates of the location of the comment on the picture and the comment parameters, and place the comment information layer on the picture layer in the web page, thus achieving the comment display.

Wherein, calculating, by the comment display implementing module 522, absolute coordinates of the location of the comment on a picture in a web page specifically includes: calculating absolute coordinates of a fixed reference point of the relative coordinates in the web page, and summing the absolute coordinates and the relative coordinates to acquire the absolute coordinates of the location of the comment on the picture in the web page.

Wherein, the fixed reference point of the relative coordinates is a vertex of a top left corner of the picture; the absolute coordinates of the fixed reference point are a sum of relative coordinates of all layers between the picture as a child object and a parent object of an outermost layer.

Further, a triggering condition for the comment parameter acquiring module 521 to send the picture comment displaying request to the web server includes: automatic triggering by the browser when entering the web page, or triggering by a user after entering the web page; and a way of displaying comment information by the comment display implementing module 522 includes one of the following ways: displaying in chronological order of the comment, displaying according to a set number of pieces of comment information and displaying according to a priority.

It should be noted that when the picture is a scaled picture, the comment parameter acquiring module 521 scales the relative coordinates according to the scale of the picture after receiving the relative coordinates.

Apparently, those skilled in the art may perform various modifications and variations on the present disclosure without departing from the spirit and scope of the present disclosure. Thus, if these modifications and variations of the present disclosure fall in the scope of the claims as well as equivalent technology of present disclosure, then the present disclosure also intends to include these modifications and variations.

The invention claimed is:

1. A method for adding a web picture comment, comprising:
   pre-setting a point within a picture as a fixed reference point, and calculating absolute coordinates of the fixed reference point in a web page;
   receiving content of a comment on the picture input by a user;
   receiving a point on the picture selected by the user as a location of the comment on the picture, by acquiring absolute coordinates of a mouse clicking event on the web page as absolute coordinates of the location of the comment on the picture;
   acquiring relative coordinates of the location of the comment on the picture with respect to the fixed reference point within the picture, by subtracting the absolute coordinates of the fixed reference point from the absolute coordinates of the location of the comment on the picture;
   uploading comment parameters comprising the relative coordinates of the location of the comment with respect to the fixed reference point, the content of the comment, and an ID of the picture to a web server;
   dynamically forming, using the relative coordinates of the location of the comment, an information layer in real-time through html and javascript layering and positioning technology, the information layer containing the content of the comment at the selected location of the comment; and placing the information layer on a picture layer, implementing the comment positioned at a certain part of the picture.

2. The method according to claim 1, wherein the fixed reference point is a vertex of a top left corner of the picture; the absolute coordinates of the fixed reference point are a sum of relative coordinates of all layers between the picture as a child object and a parent object of an outermost layer.

3. The method according to claim 2, further comprising: when the picture is a scaled picture, restoring the relative coordinates to be uploaded to the web server to relative coordinates in 1:1 according to the scale of the picture.

4. The method according to claim 1, further comprising: when the picture is a scaled picture, restoring the relative coordinates to be uploaded to the web server to relative coordinates in 1:1 according to the scale of the picture.

5. A method for displaying a web picture comment, comprising:
   sending a web server a picture comment displaying request to display a comment positioned at a part of a picture in a web page, and receiving comment parameters comprising relative coordinates of a location of the comment on the picture with respect to a fixed reference point within the picture and a content of the comment fed back by the web server;
   calculating absolute coordinates of the fixed reference point in the web page, and acquiring absolute coordinates of the location of the comment in the web page by adding the absolute coordinates of the fixed reference point to the relative coordinates of the location of the comment fed back by the web server;
   dynamically forming, based on the absolute coordinates of the location of the comment, an information layer in real-time through html and javascript page layering and positioning technology, the information layer containing the content of the comment at the location of the comment, and placing the information layer on a picture layer, implementing the comment positioned at a certain part of the picture.

6. The method according to claim 5, wherein the fixed reference point of the relative coordinates is a vertex of a top left corner of the picture; the absolute coordinates of the fixed reference point are a sum of relative coordinates of all layers between the picture as a child object and a parent object of an outermost layer.

7. The method according to claim 6, further comprising:
   when the picture is a scaled picture, scaling the relative coordinates according to the scale of the picture after receiving the relative coordinates, wherein
   a triggering condition of sending a picture comment displaying request to a web server is: automatic triggering by a browser when entering the web page, or triggering by a user after entering the web page; and
   a way of displaying comment information comprises one of the following ways: displaying in chronological order of the comment, displaying according to a set number of pieces of comment information, and displaying according to a priority.

8. The method according to claim 5, further comprising:
   when the picture is a scaled picture, scaling the relative coordinates according to the scale of the picture after receiving the relative coordinates, wherein
   a triggering condition of sending a picture comment displaying request to a web server is: automatic triggering by a browser when entering the web page, or triggering by a user after entering the web page; and
   a way of displaying comment information comprises one of the following ways: displaying in chronological order of the comment, displaying according to a set number of pieces of comment information, and displaying according to a priority.

\* \* \* \* \*